United States Patent Office.

GUSTAVE ADOLPHE CANNOT, OF LONDON, ENGLAND.

MATERIAL FOR INSULATING ELECTRIC WIRES.

SPECIFICATION forming part of Letters Patent No. 515,192, dated February 20, 1894.

Application filed September 22, 1893. Serial No. 486,217. (No specimens.) Patented in England September 1, 1891, No. 14,791; in France September 15, 1891, No. 216,144; in Belgium September 15, 1891, No. 96,398, and in Austria-Hungary April 21, 1892, No. 60,599.

*To all whom it may concern:*

Be it known that I, GUSTAVE ADOLPHE CANNOT, manufacturer, a subject of the Queen of Great Britain, residing at London, in the county of Middlesex, England, have invented certain new and useful Improvements in Material for Insulating Electric Wires, (for which I have obtained Letters Patent of Great Britain, dated September 1, 1891, No. 14,791; in France, dated September 15, 1891, No. 216,144; in Belgium, dated September 15, 1891, No. 96,398, and in Austria-Hungary, dated April 21, 1892, No. 60,599,) of which the following is a specification.

My invention relates to improvements in the insulation of electrical wires and it consists of the novel features hereinafter described and claimed.

For the purpose of insulating electrical conducting wires I take ordinary fibrous peat and after thoroughly washing and cleansing it I bring it by carding machinery or other ordinary machinery of the like kind, into a fleecy state. I then stretch a sufficient length of the wire which is to be insulated, and I cover it with a thin coating of melted bitumen. The fibrous fleecy peat is then applied to the bitumen covering, to which it adheres in sufficient thickness to form a uniform coating. I then apply to the surface of this peat coating a thin layer of melted spermaceti, which I cover with another coating of the fibrous peat as before. The whole is then coated with tar and with another external coating of the peat, and the wire covered as described is passed through a suitable guide by which its surface is leveled and made uniform. Instead of one wire, two or more may be used, and a cable thus formed and immersed in the sea, after having had the usual wire protecting cover added to it where necessary, will be of almost indefinite durability, and will not lose any of the electric current passing through it, a matter of great importance in submarine telegraphy. The spermaceti has the property of neither becoming dry nor hard, and however the cable may be bent and convoluted, the tangential fibers do not become injuriously stretched. Such a cable is quite impervious to water, without liability to decay, and of extreme elasticity, (the properties which give its greatest value to gutta percha,) while it is comparatively very cheap.

The method of construction described, and of utilizing peat fiber, may be modified more or less. For instance, the fibrous peat may be made by suitable carding and spinning machinery of the ordinary kind into a stout yarn with which the conducting wires used for electric telegraphs and telephones and the like purposes may be covered by means of covering machinery of the well known kind. Such peat fiber when applied with the layers of waterproof insulating material, such as the bitumen and spermaceti before referred to forms an insulating material of a very perfect and durable kind.

Instead of the peat fiber being spun into yarns as just described, I sometimes form it by carding machinery into a web of considerable thickness, which I then compress by hydraulic or other pressure to the thickness of stiff paper, and I cut this compressed sheet into strips which I wind around the bitumen covered wires which are to be insulated.

What I claim, and desire to secure by Letters Patent of the United States, is—

1. As an article of manufacture, an insulating covering for electric wires consisting of a coating of bitumen, peat fiber, spermaceti and tar, substantially as and for the purposes described.

2. An insulating covering for electric wires consisting of a coating first of bitumen, second of peat fiber, third of spermaceti, fourth of tar, and fifth of peat fiber, substantially as and for the purposes described.

In testimony whereof I have hereunto set my hand in the presence of two witnesses.

GUSTAVE ADOLPHE CANNOT.

Witnesses:
C. EIDELER,
*Commercial Clerk,* 20 *Bucklersbury, London, E. C.*
C. LESLIE JOHNSON,
*Gentleman,* 20 *Bucklersbury, London, E. C.*